US009885416B2

(12) United States Patent
Blanchard

(10) Patent No.: US 9,885,416 B2
(45) Date of Patent: Feb. 6, 2018

(54) TRANSMISSION ASSEMBLY FOR A SELF-PROPELLED MACHINE, OF THE TYPE THAT CAN BE POSITIONED BETWEEN THE PRIMARY MOTOR SHAFT AND THE WHEELS OF SAID MACHINE

(71) Applicant: FRANCE REDUCTEURS, Les Herbiers (FR)

(72) Inventor: Robert Blanchard, Le Boupere (FR)

(73) Assignee: FRANCE REDUCTEURS, Les Herbiers (FR)

( * ) Notice: Subject to any disclaimer, the term of this patent is extended or adjusted under 35 U.S.C. 154(b) by 71 days.

(21) Appl. No.: 14/436,369

(22) PCT Filed: Sep. 17, 2013

(86) PCT No.: PCT/FR2013/052122
§ 371 (c)(1),
(2) Date: Apr. 16, 2015

(87) PCT Pub. No.: WO2014/060663
PCT Pub. Date: Apr. 24, 2014

(65) Prior Publication Data
US 2015/0252899 A1    Sep. 10, 2015

(30) Foreign Application Priority Data
Oct. 18, 2012  (FR) .................................... 12 59919

(51) Int. Cl.
*F16H 63/48* (2006.01)
*F16H 61/662* (2006.01)
(Continued)

(52) U.S. Cl.
CPC .............. *F16H 63/48* (2013.01); *B60T 1/062* (2013.01); *F16H 59/02* (2013.01); *F16H 61/26* (2013.01);
(Continued)

(58) Field of Classification Search
CPC ........ F16H 63/43; F16H 63/345; F16H 61/26; F16H 61/66272; F16H 59/02;
(Continued)

(56) References Cited

U.S. PATENT DOCUMENTS 1,241,895 A * 10/1917 Altorfer .................. F16H 3/145
68/274
4,759,417 A * 7/1988 Wanie .................... B60K 20/00
180/273
(Continued)

FOREIGN PATENT DOCUMENTS

EP    1 516 791 A2    3/2005
EP    1 946 983 A1    7/2008
(Continued)

OTHER PUBLICATIONS

International Search Report, dated Jan. 7, 2014, from corresponding PCT application.

*Primary Examiner* — Jacob S Scott
*Assistant Examiner* — Tinh Dang
(74) *Attorney, Agent, or Firm* — IPSILON USA, LLP

(57) ABSTRACT

A transmission assembly for a self-propelled machine includes a transmission housing fitted with an input shaft, an output shaft, a mechanism for reversing the rotational drive direction of the output shaft, and a brake mechanism, each mechanism including a control, the direction reversing and brake controls carried by the housing being mounted respectively movable, one between at least three positions: a neutral, a forward and a reverse position, the other between at least a first braking position and a non-braking position, the brake control being couplable to a brake control member that can be actuated by the operator, in order to shift the brake control from the non-braking to the first braking position. The brake control has a separate second braking position, and the transmission assembly includes return (Continued)

elements capable, in the neutral position of the direction reversing control, of returning the brake control to the second braking position.

18 Claims, 13 Drawing Sheets

(51) Int. Cl.
*F16H 63/34* (2006.01)
*F16H 59/02* (2006.01)
*F16H 61/26* (2006.01)
*B60T 1/06* (2006.01)
*F16H 3/14* (2006.01)

(52) U.S. Cl.
CPC ..... *F16H 61/66272* (2013.01); *F16H 63/345* (2013.01); *F16H 3/145* (2013.01); *F16H 2059/0234* (2013.01); *F16H 2061/66295* (2013.01); *F16H 2312/09* (2013.01)

(58) Field of Classification Search
CPC ........... F16H 2061/66295; F16H 3/145; F16H 2059/0234; B60T 1/062
See application file for complete search history.

(56) References Cited

U.S. PATENT DOCUMENTS

| | | | |
|---|---|---|---|
| 5,394,764 A | 3/1995 | Fini, Jr. | |
| 8,671,791 B2* | 3/2014 | Blanchard | F16H 3/145 74/376 |
| 2006/0172857 A1 | 8/2006 | Eavenson, Sr. et al. | |
| 2010/0307269 A1* | 12/2010 | Blanchard | F16H 61/16 74/376 |

FOREIGN PATENT DOCUMENTS

FR   2 940 773 A1   7/2010
WO   2009/061391 A1   5/2009

* cited by examiner

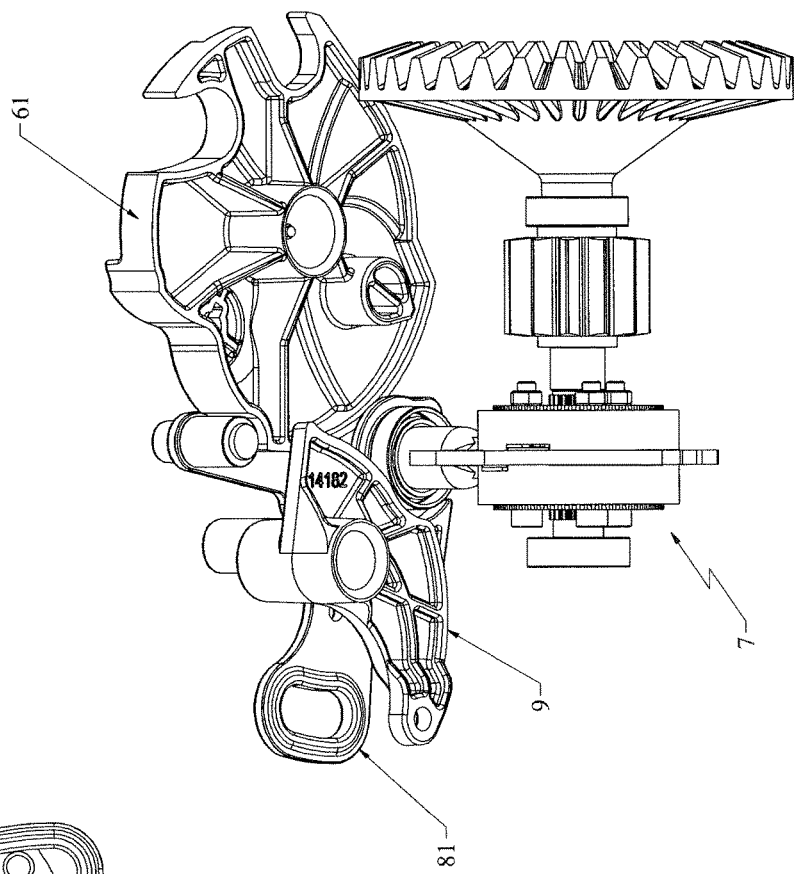
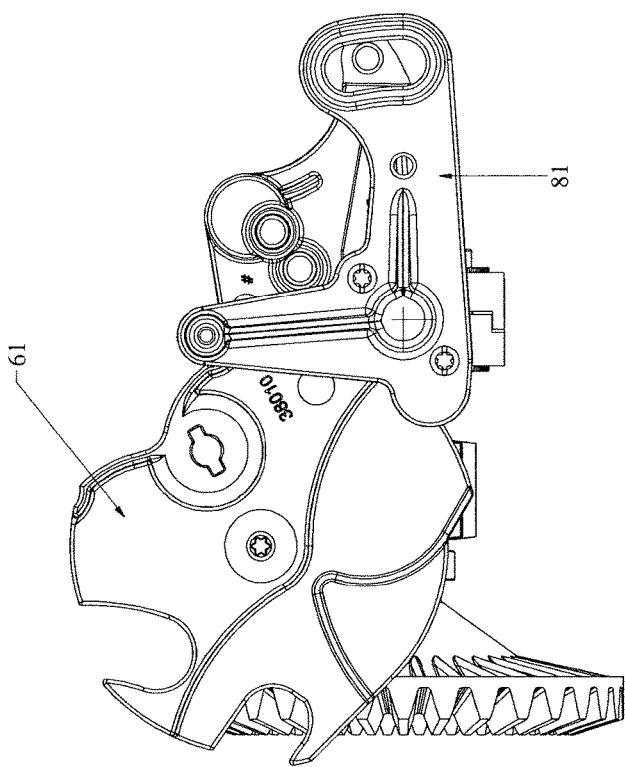
FIG. 8B
FIG. 8A

TRANSMISSION ASSEMBLY FOR A SELF-PROPELLED MACHINE, OF THE TYPE THAT CAN BE POSITIONED BETWEEN THE PRIMARY MOTOR SHAFT AND THE WHEELS OF SAID MACHINE

The present invention relates to a transmission assembly for a self-propelled machine that can be positioned between the primary motor shaft and the wheels of said machine.

It relates more specifically to a transmission assembly including a transmission housing fitted with an input shaft, which can be driven in rotation by the primary shaft in a single direction only, and an output shaft, such as the main shaft of the wheels of the machine, to which the movement of the input shaft can be transmitted, a mechanism for reversing the rotational drive direction of the output shaft, a mechanism for braking the input shaft and/or the output shaft and/or the means for transmitting movement between the input shaft and the output shaft, each mechanism comprising a control, said direction reversing and brake controls carried by said housing being mounted respectively movably, one between at least three positions, i.e. a neutral position, a forward position and a reverse position, the other between at least one position referred to as the first braking position and a non-braking position, said brake control being couplable to an operator-actuated brake control member to shift said brake control from the non-braking position to said first braking position under the action of said operator-actuated brake control member.

The market for small self-propelled machines such as lawn tractors and snow ploughs has grown significantly in recent years. To date, such machines have been fitted with a member, such as a brake pedal, that is actuated by the operator to shift from the non-braking position to the braking position, and with a separate parking brake. The type of work being done, such as mowing, requires the driver of the engine to get off the engine frequently. Drivers often forget to apply the parking brake before getting off the machine, which results in a risk of accident.

One purpose of the present invention is therefore to propose a transmission assembly designed to enable the automatic actuation of a parking brake without any specific action by the driver on the brake controls.

Another objective of the present invention is to propose a transmission assembly of simple design with shared parking and vehicle brake mechanisms.

For this purpose, the invention relates to a transmission assembly for a self-propelled machine that can be positioned between the primary motor shaft and the wheels of said machine and comprising a transmission housing fitted with an input shaft, which can be driven in rotation by the primary shaft in a single direction only, and an output shaft, such as the main shaft of the wheels of the machine, to which the movement of the input shaft can be transmitted, a mechanism for reversing the rotational drive direction of the output shaft, a mechanism for braking the input shaft and/or the output shaft and/or the means for transmitting movement between the input shaft and the output shaft, each mechanism comprising a control, said direction reversing and brake controls carried by said housing being mounted respectively movably, one between at least three positions, i.e. a neutral position, a forward position and a reverse position, the other between at least one position referred to as the first braking position and a non-braking position, said brake control being couplable to a brake control member that can be actuated by the operator to shift said brake control from the non-braking position to said first braking position under the action of said operator-actuated brake control member, characterized in that the brake control has a second braking position separate from the first braking position, and in that the transmission assembly comprises firstly return means, said return means being capable, in the neutral position of the direction reversing control, of returning said brake control to the second braking position, and secondly means for moving the brake control from the second braking position to the non-braking position, said means for moving the brake control being at least partially formed by the direction reversing control active on said brake control, against the return means when said direction reversing control is shifted from the neutral position to the forward position or reverse position.

The presence of return means able, in the neutral position of the direction reversing control, to recall the brake control to the second brake position, enables automatic actuation of the brake control when the driver actuates the direction reversing control and shifts to neutral. This obviates the need for the driver to independently actuate the brake control. Furthermore, the fact that the direction reversing control is designed to enable, when it is being shifted from the neutral position to the forward or reverse position, the automatic shifting of the brake control from the second braking position to the non-braking position, means that the driver does not have to release the brakes when he decides to move said machine forwards or backwards. This makes it easier to drive the machine while making it safer. The direction reversing control is therefore designed such as to enable, in neutral position, the brake control to be shifted from the non-braking position to the second braking position and to shift the brake control from the second braking position to the non-braking position when the same is shifted from the neutral position to the forward or reverse position.

Preferably, the brake mechanism includes a supplementary control, referred to as the additional control, that can be actuated by the operator between an inactive position and an active position, this additional control being able, while same is being activated and while the brake control is in the second braking position, to cooperate with the brake control to shift the brake control from the second braking position to the non-braking position.

This additional control makes it possible to move the machine, for example by pushing or pulling same, when the machine is stopped and the brake control members, such as the operator-actuated brake pedal, are not accessible. This is for example the case when the machine is stowed in a shelter. This additional control is usually positioned on the outside of the machine to the rear of said machine and is preferably actuated by hand by the operator.

Preferably, the brake control is arranged, at least partially, on the path followed by the additional control during activation of same to enable the brake control, in parallel with activation of the additional control, to be shifted from the second braking position to the non-braking position by simple bearing contact.

Preferably, the brake mechanism, mounted on the input shaft or the output shaft or a shaft of the transmission means between the input shaft and the output shaft, includes at least one pair of substantially coaxial parts having conical surfaces that can be slid onto said shaft, the first or external cone being mounted such that it is constrained to rotate with said shaft, and the second or internal cone, being mounted non-rotatably in relation to said shaft, the internal cone being a wheel with a conical axial bore and the external cone, which preferably has a truncated cone shape, having a central recess to enable it to be slid onto said body, and the brake control is able to cause a relative axial movement of the cones towards or away from one another, the external cone, when said cones are in closed position corresponding to the braking position, being seated inside the axial bore of the internal cone, with the external conical peripheral surface of same engaged, by bearing contact, with the conical seat of the internal cone.

Generally, the brake control and the direction reversing control each include at least one movable part, referred to as a controlled part, said controlled movable parts being respectively couplable by movement transmission means in one case to the operator-actuated brake control member and in the other case to a operator-actuated direction reversing control member.

Preferably, the controlled movable part of the direction reversing control is a linear or rotary cam and the controlled movable part of the brake control is a pivoting lever stressed by the return means of the brake control into a bearing position against the external profile of the cam, said cam being formed such that, when moving from the neutral position to the forward or reverse position, it acts against the return means on the lever, in order to move the lever.

Generally, the pivoting lever and the cam are mounted in rotation about parallel axes.

Preferably, the brake control also includes a two-pronged fork coupled to and constrained to rotate with the controlled movable part, each prong of the fork having an internal radial tooth forming the active part of the fork that can be positioned close to at least one of said cones to move said cones closer together.

Preferably, the direction reversing mechanism carried by one of the shafts, preferably the input shaft, includes two dog elements referred to respectively as the forward dog and the reverse dog, and a movable dog interposed between the forward and reverse dog elements, said forward and reverse dog elements being mounted couplably/uncouplably in rotation on the shaft carrying same by means of the dog mounted movably and axially on said shaft using the direction reversing control to occupy a forward position in which the movable dog is engaged with the forward dog element, a reverse position in which the movable dog is engaged with the reverse dog element or a neutral position in which the movable dog is not engaged with either the forward or reverse dog element.

Preferably, the transmission assembly also includes a drive shaft that can be driven in rotation by the primary motor shaft, this drive shaft being linked to said input shaft forming the shaft driven by an endless belt drive and, arranged between the drive shaft and the output shaft, a clutch mechanism fitted with a clutch control mounted movably between at least an engaged position and a disengaged position, the direction reversing control forms, in the neutral position of said control, means for blocking the clutch control that can prevent the clutch control from shifting from the disengaged position to the engaged position, and the clutch control forms, in the engaged position of the clutch control, means for locking the direction reversing control that can prevent the direction reversing control from shifting from the forward or reverse position to the neutral position.

This arrangement enables an operating mechanism to be established. Indeed, the fact that the direction reversing control, in the neutral position of said control, forms means for blocking the clutch control requires the driver to actuate the direction reversing control and to select the forward or reversing direction of movement of the machine before engaging the clutch to ensure smooth running. Equally, the fact that the clutch control, in the engaged position of the clutch control, forms means for locking the direction reversing control requires the driver to actuate the declutch control before returning to the neutral position and potentially reversing the direction of movement of the machine, thereby eliminating all risk of damage.

Preferably, the clutch control includes at least one controlled movable part that is carried on the housing and couplable using movement transmission means to an operator-controlled clutch control member, and the controlled movable parts of the clutch control and of the direction reversing control are fitted respectively with a locking member in the first case and two complementary locking members in the second case that are able to cooperate alternately with the locking member of the clutch control, depending on whether the direction reversing control is in the forward or reverse position.

Also preferably, the clutch mechanism is built into the belt drive.

Generally, the belt drive is a variable-speed transmission and includes two pulleys with variable-gap flanges, the first or drive pulley being carried on the drive shaft, the second or driven pulley being carried on the input shaft and means for opening or closing the flanges of the drive pulley in relation to one another, the clutch mechanism includes an idle member that is able to cooperate with the movable flange of the controlled drive pulley, this idle member, such as a bearing, roller or mounting, having a surface that is free to rotate about the shaft bearing the controlled pulley and about which the belt is partially wound when the flanges of the drive pulley are in open position such as to prevent any transmission of movement between the pulley-bearing shafts, the movable flange of the controlled drive pulley overlapping said idle member when the flanges of said pulley are being closed together to enable the belt to be wound around the inside of the slot formed by the flanges and to enable the speed variator to shift from a disengaged position to an engaged position, the continued closing of the flanges of the controlled drive pulley enabling the speed to be varied at will, and the means for controlling the opening and closing of the flanges of the drive pulley are at least partially shared with the clutch control.

The operator-actuated clutch control member is shared with the operator-actuated direction reversing control member or is separate from said direction reversing control member.

The invention also relates to a self-propelled machine comprising a primary motor shaft, wheels and a transmission assembly arranged between the primary motor shaft and the wheels, characterized in that the transmission assembly is as described above.

The invention is detailed in the description below of example embodiments, provided with reference to the attached drawings, in which:

FIG. 3A is a partial perspective view of the reversing mechanism and of the clutch mechanism built into a speed variation mechanism;

FIGS. 8A and 8B are respectively top and perspective views of the direction reversing and brake controls related to the brake mechanism when the direction reversing control is in forward position and the braking device is in non-braking position;

Figure 1:
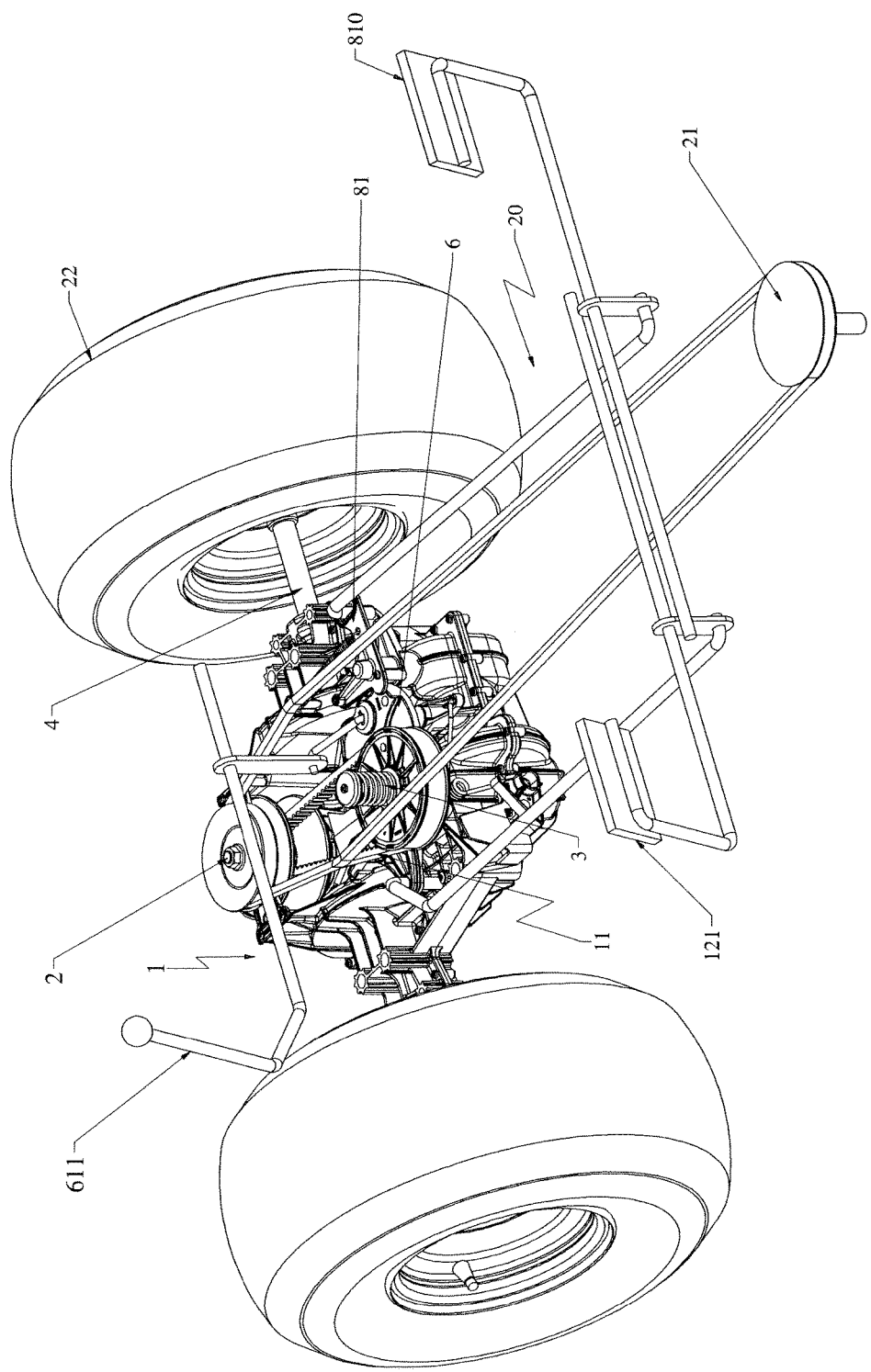
FIG. 1 is a perspective view of a machine fitted with a transmission assembly according to the invention, with the bodywork of the machine omitted.
Figure 2:
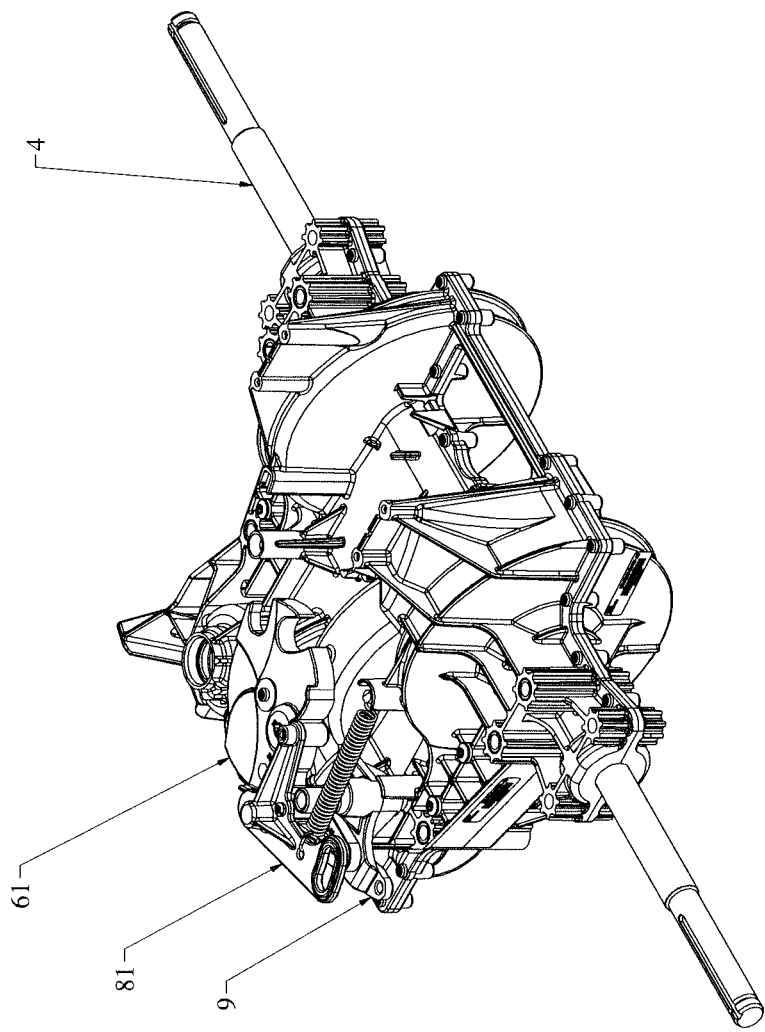
FIG. 2 is a perspective view of a transmission assembly according to the invention.
Figure 3:
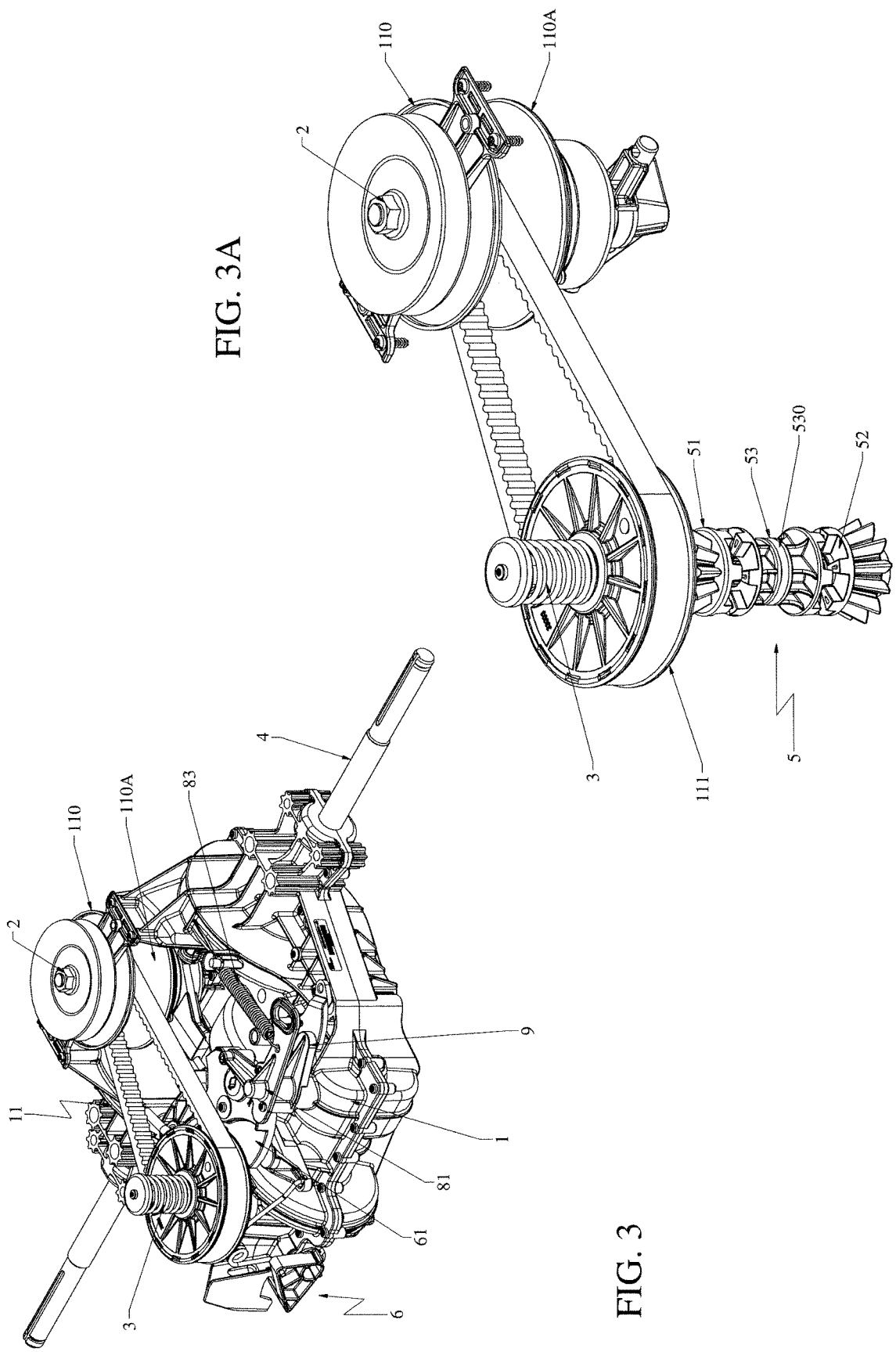
FIG. 3 is a perspective view of a transmission assembly according to the invention taken from another angle.

As mentioned above, the transmission assembly to which the invention relates is designed to be installed on a self-propelled machine 20, such as a lawn tractor, fitted with a primary motor shaft 21 and wheels 22.

This assembly includes a transmission housing 1 formed in this case by two half-shells assembled along a joint plane. This transmission housing 1 includes, protruding at least partially from the housing 1, an input shaft 3 and an output shaft 4 that forms, in the examples shown, the main shaft of the wheels of the machine.

The input shaft 3 can be driven in rotation by the primary motor shaft 21 and transmit movement to the output shaft 4.

The assembly also includes a direction reversing mechanism 5 for the rotational drive of the output shaft 4, controlled by a direction reversing control 6 carried on said housing 1.

In the examples shown, the direction reversing mechanism 5 is carried on the input shaft 3 and includes two dog elements 51, 52, one of which, indicated using reference sign 51 in the figures, being referred to as the forward dog element, and the other, indicated using reference sign 52 in the figures, being referred to as the reverse dog element, and a movable dog 53 interposed between the forward and reverse dog elements 51, 52. The forward and reverse dog elements 51, 52 are mounted couplably/uncouplably in rotation on the shaft 3 carrying same by means of the dog 53 mounted movably and axially on said shaft 3 using the direction reversing control 6 to occupy a forward position in which the movable dog 53 is engaged with the forward dog element 51, a reverse position in which the movable dog 53 is engaged with the reverse dog element 52 and a neutral position in which the movable dog 53 is not engaged with either the forward or reverse dog element 51, 52.

Figure 4:
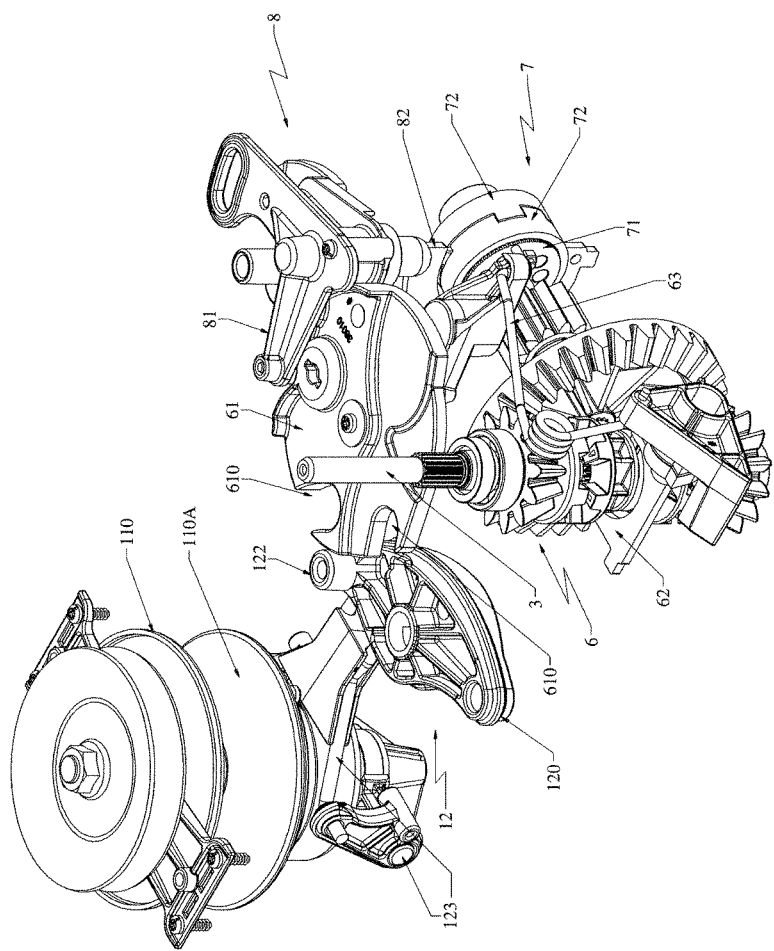
FIG. 4 is a partial perspective view of the clutch and direction reversing controls related to the mechanisms of same.
Figure 5:
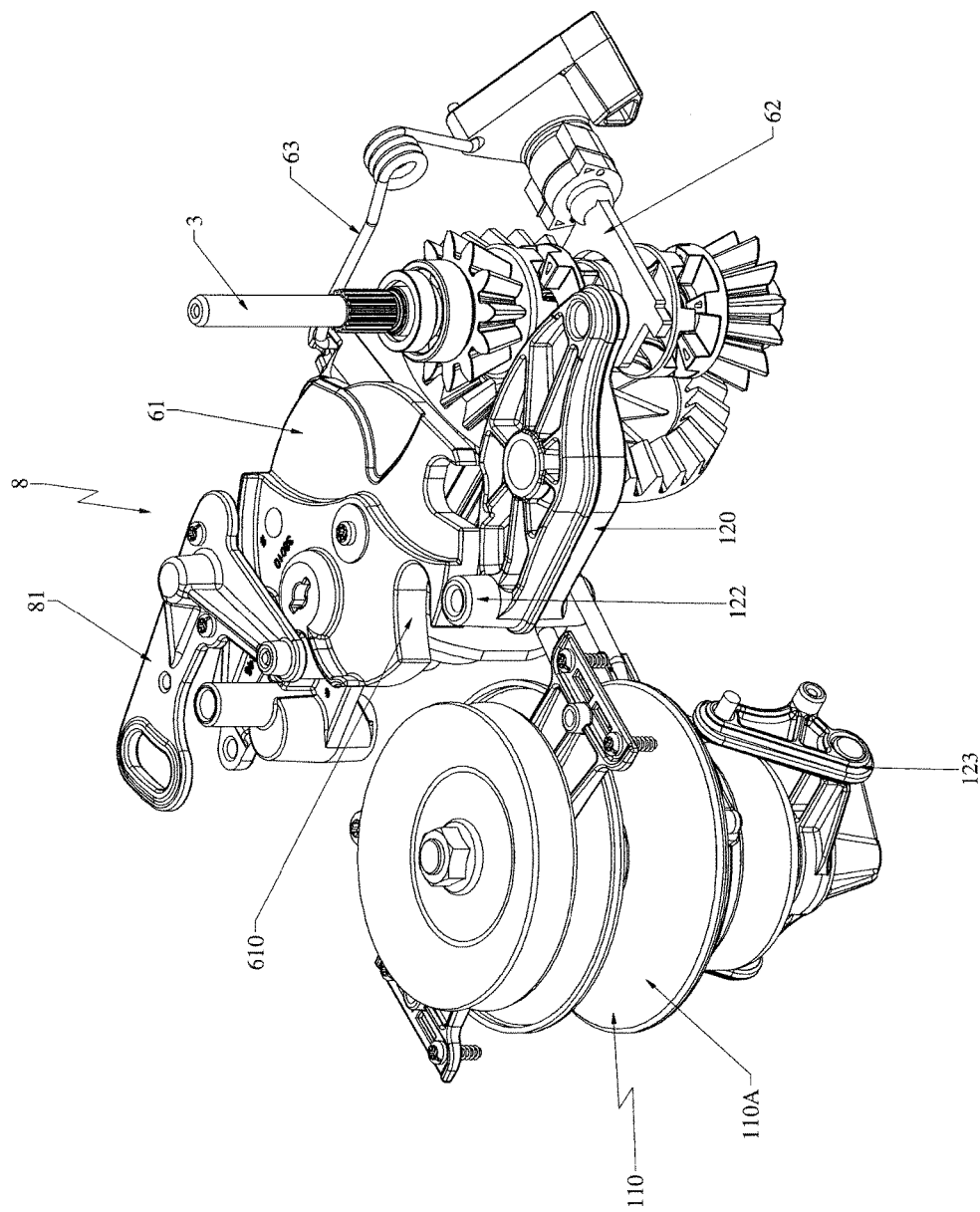
FIG. 5 is a partial perspective view, taken from another angle, of the clutch and direction reversing mechanisms associated with the controls of same.
Figure 6:
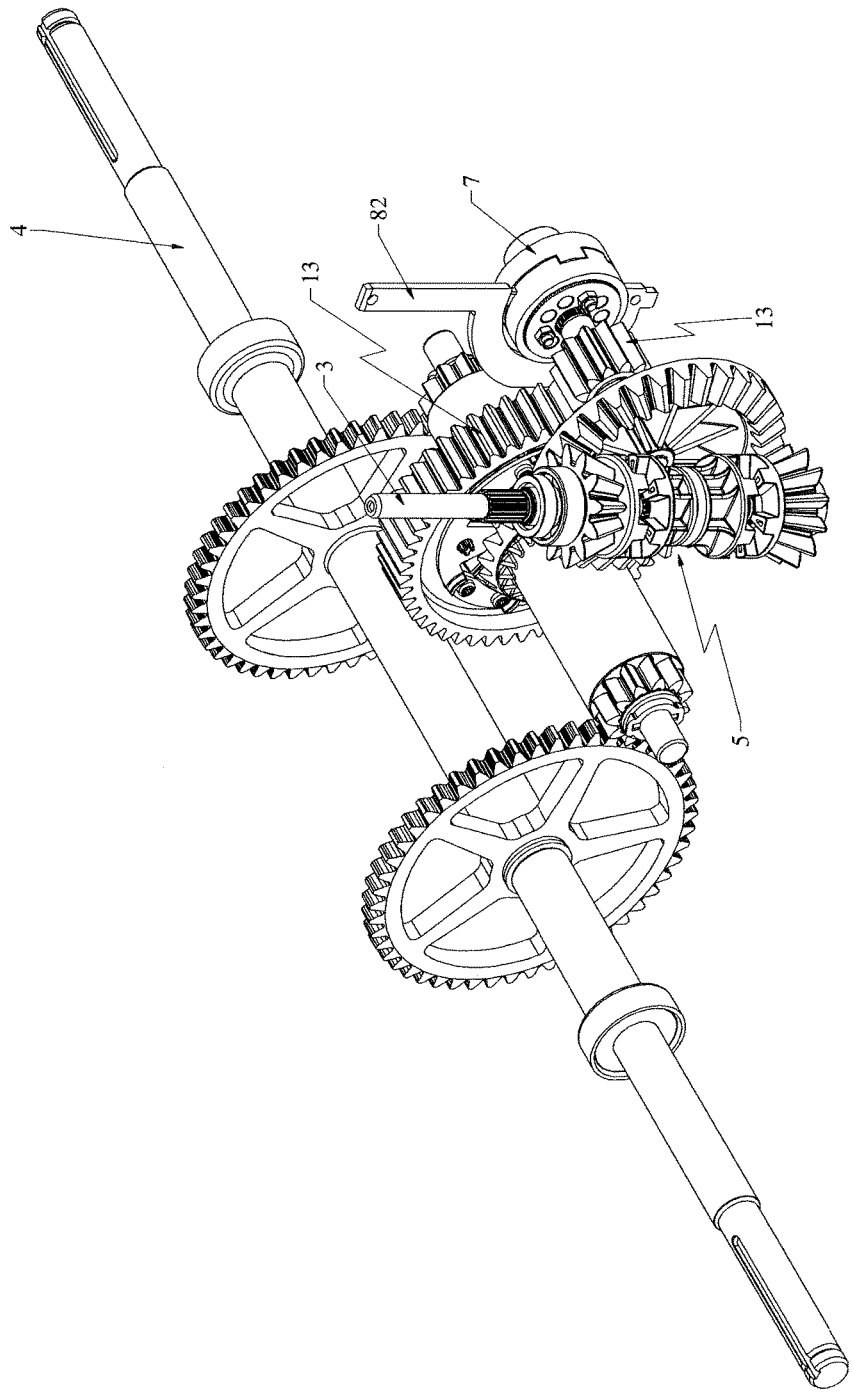
FIG. 6 is a partial perspective view of the means for transmitting movement between the input shaft and the output shaft.
Figure 7B:
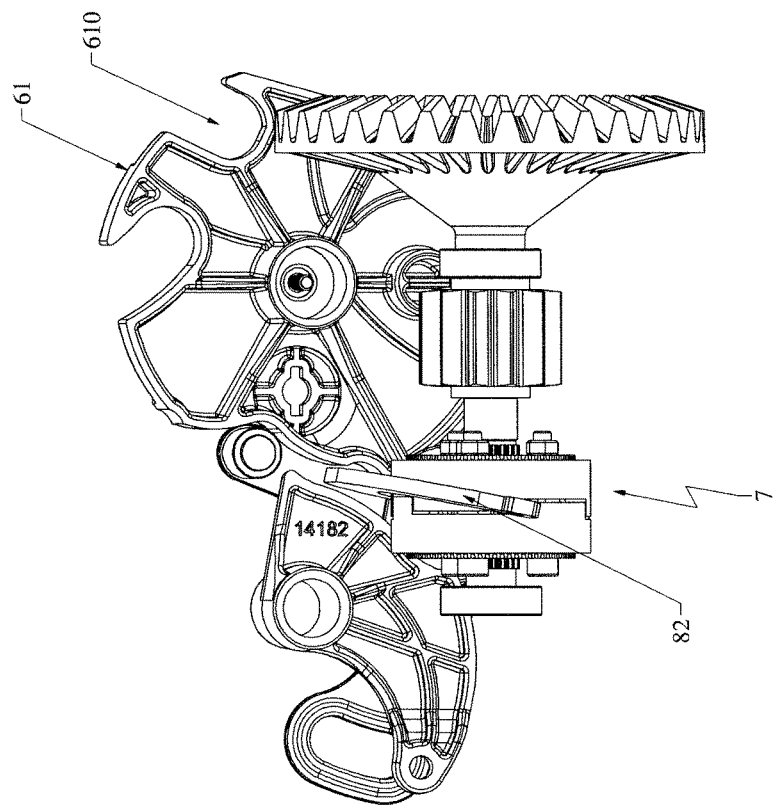
FIGS. 7A and 7B are respectively perspective and worm's-eye views of the direction reversing and brake controls related to the brake mechanisms in the second braking position of the brake control.
Figure 7A:
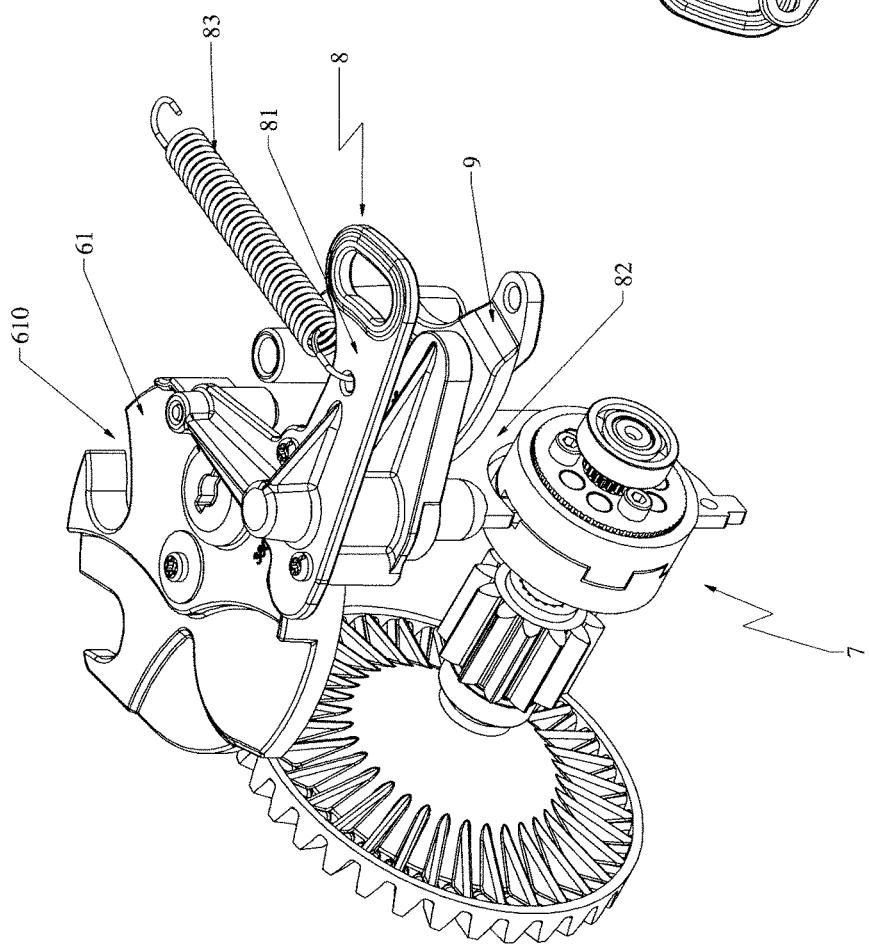
Figure 9B:
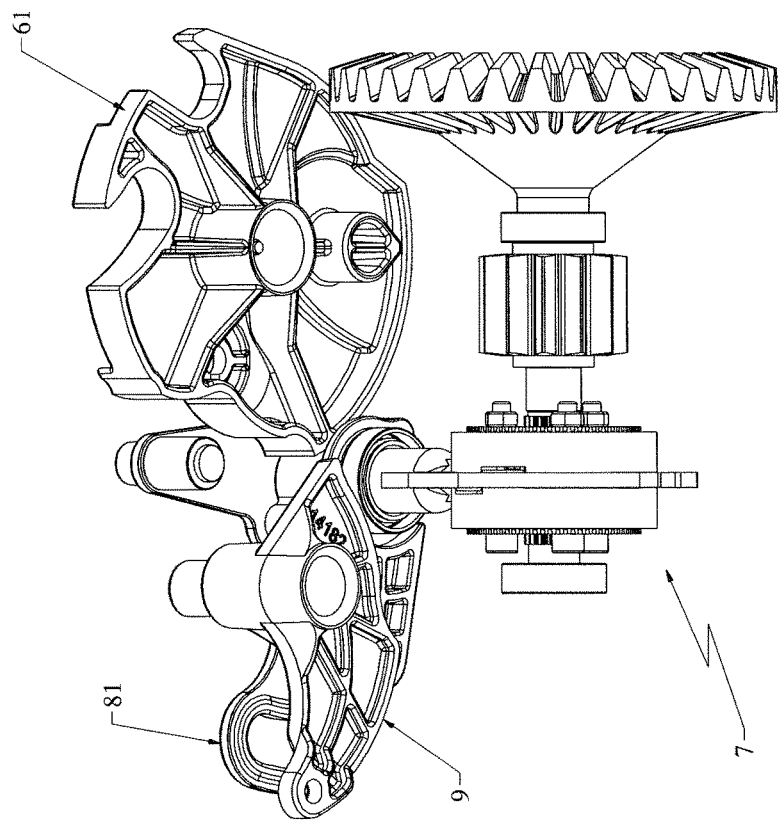
FIGS. 9A and 9B are respectively top and partial perspective views of the brake and direction reversing controls with the additional control in the active position in which the brake control is in the non-braking position.
Figure 9A:
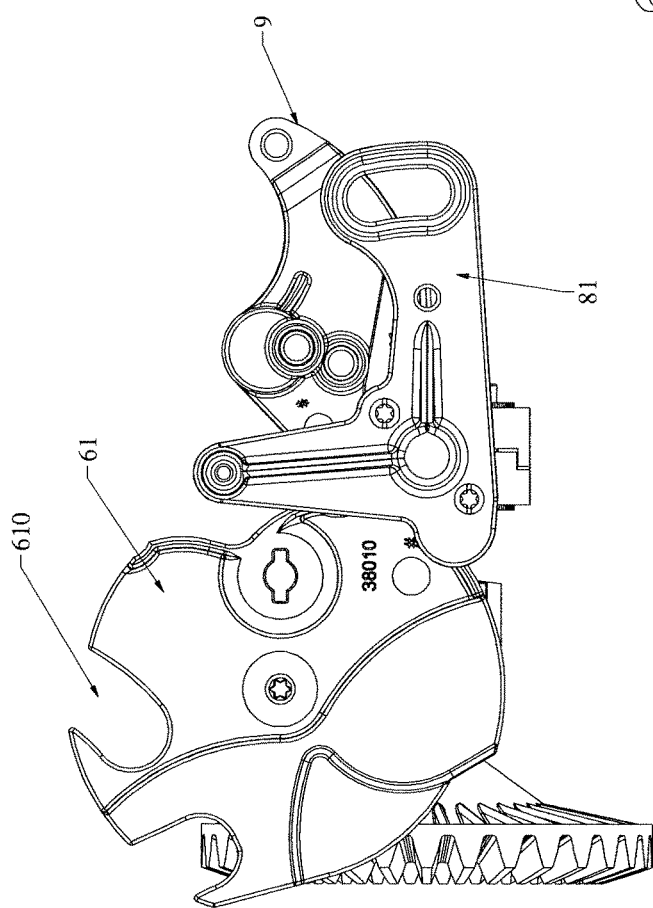
Figure 10A:
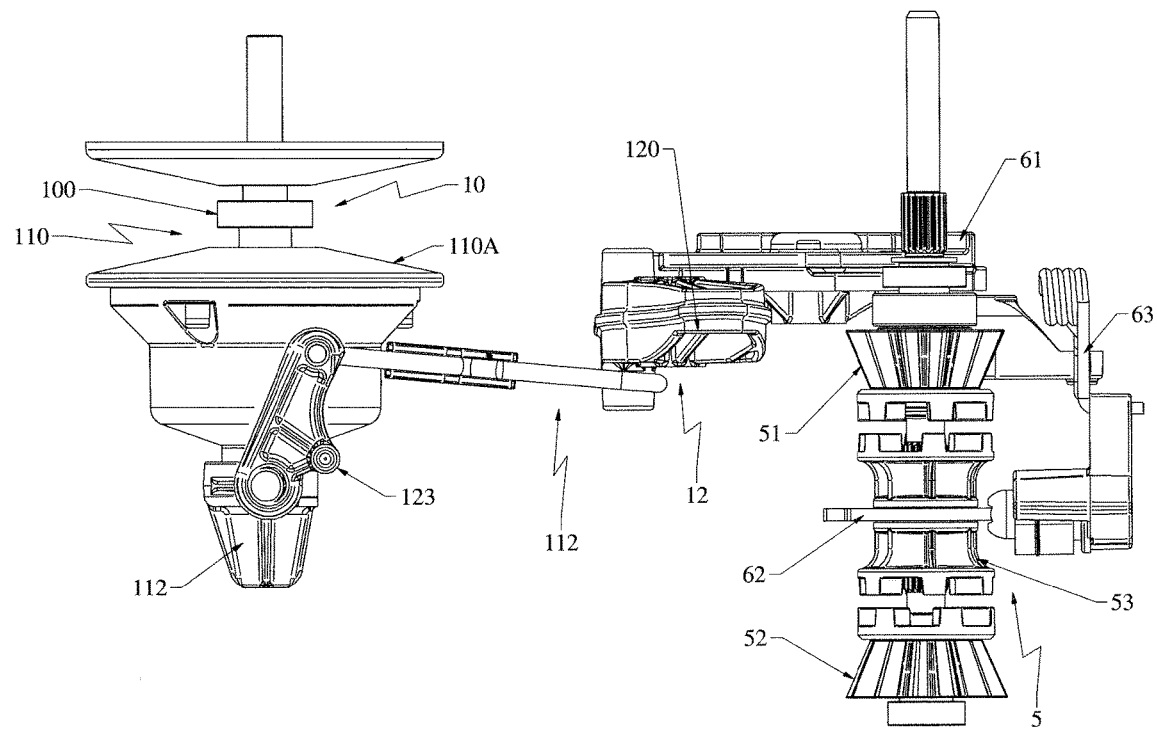
FIGS. 10A and 10B are respectively front and top views of the direction reversing and clutch mechanisms related to the controls of same with the direction reversing control in neutral position and the clutch control in disengaged position.
Figure 10B:
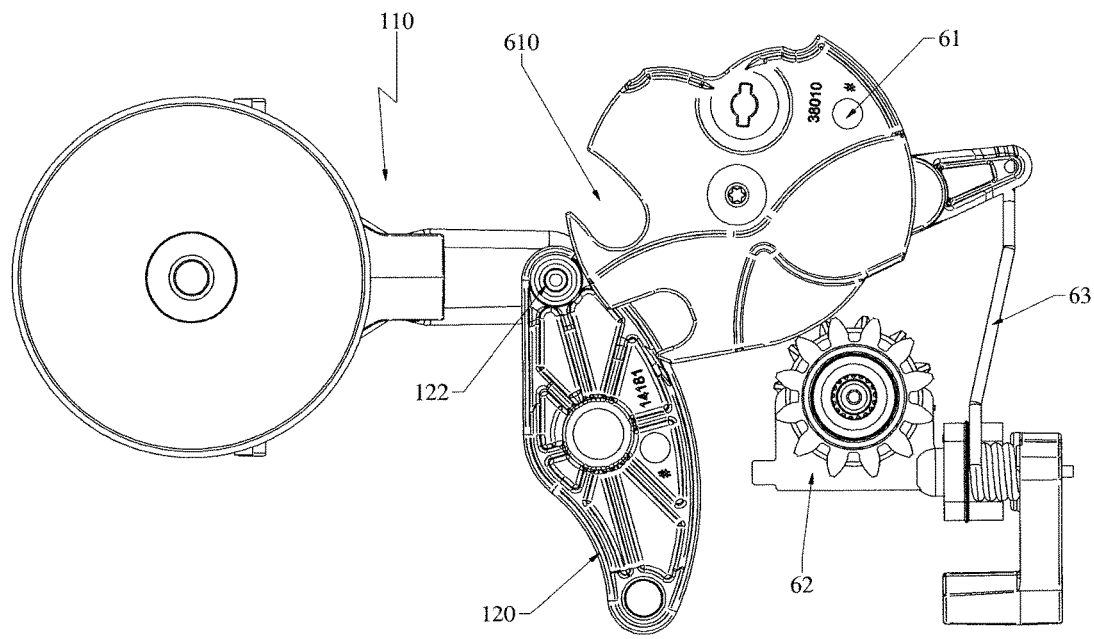
Figure 11A:
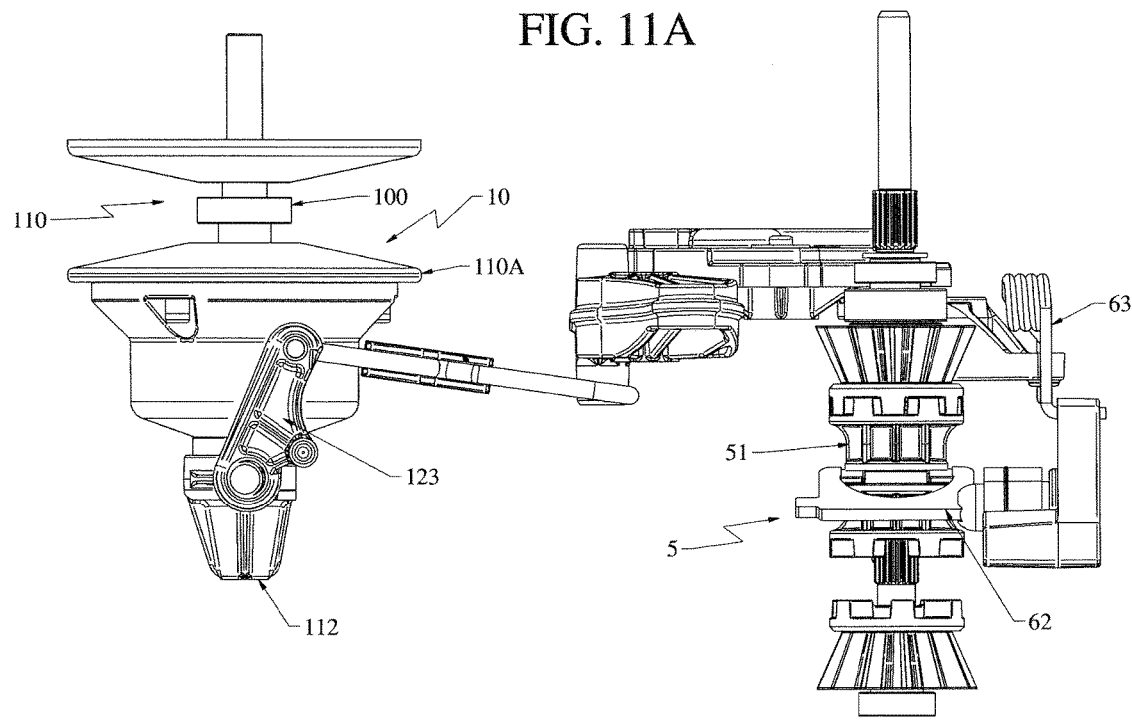
FIGS. 11A and 11B are respectively front and top views of the direction reversing and clutch mechanisms related to the controls of same with the direction reversing control in forward position and the clutch control in disengaged position.
Figure 11B:
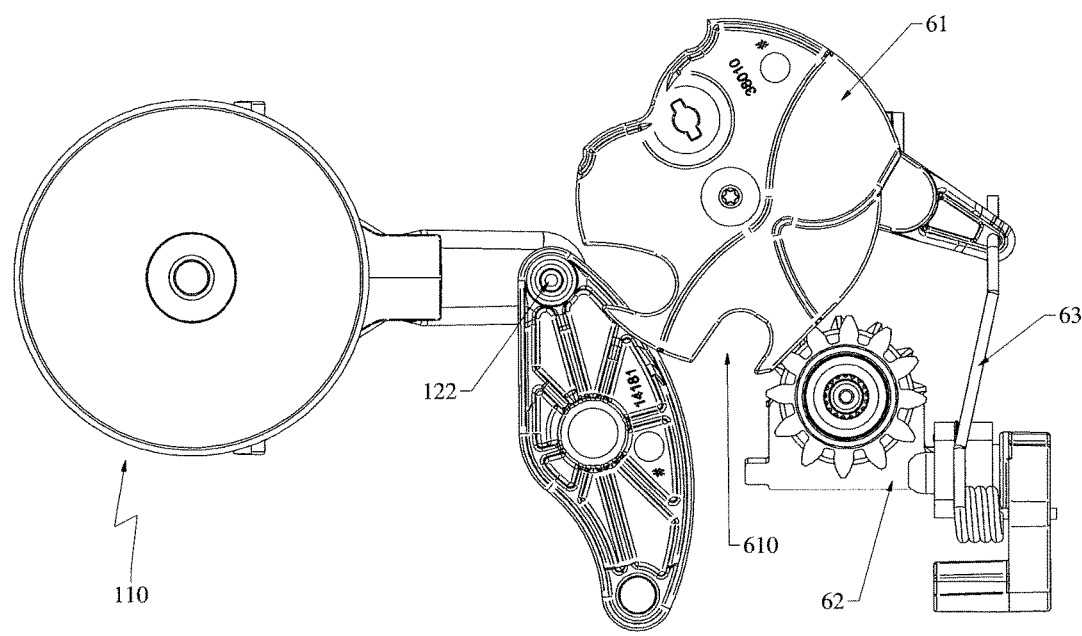
Figure 12A:
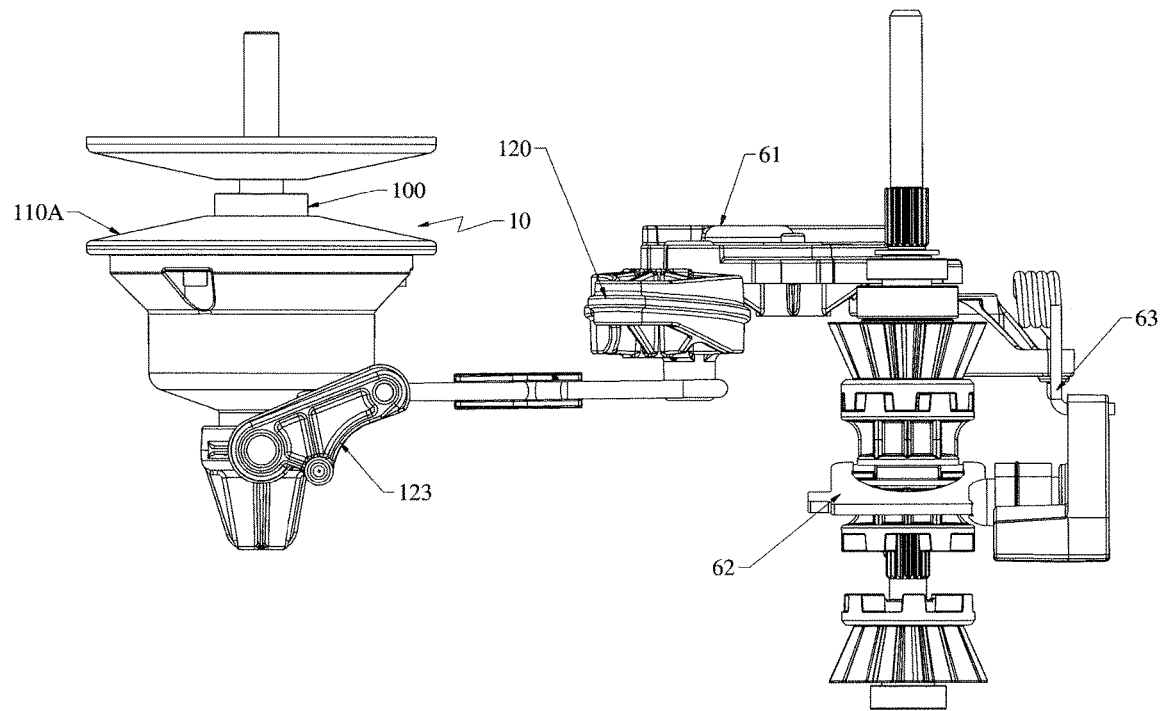
FIGS. 12A and 12B are respectively front and top views of the direction reversing and clutch mechanisms related to the controls of same with the direction reversing control in forward position and the clutch control in engaged position.
Figure 12B:
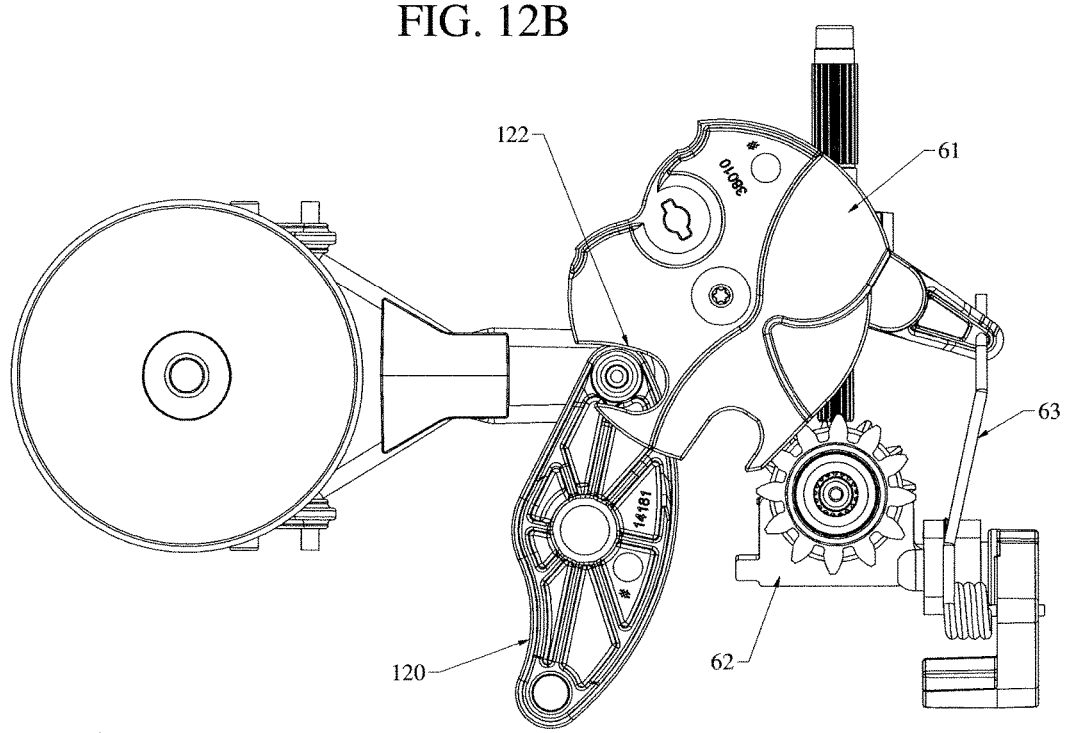
Figure 13A:
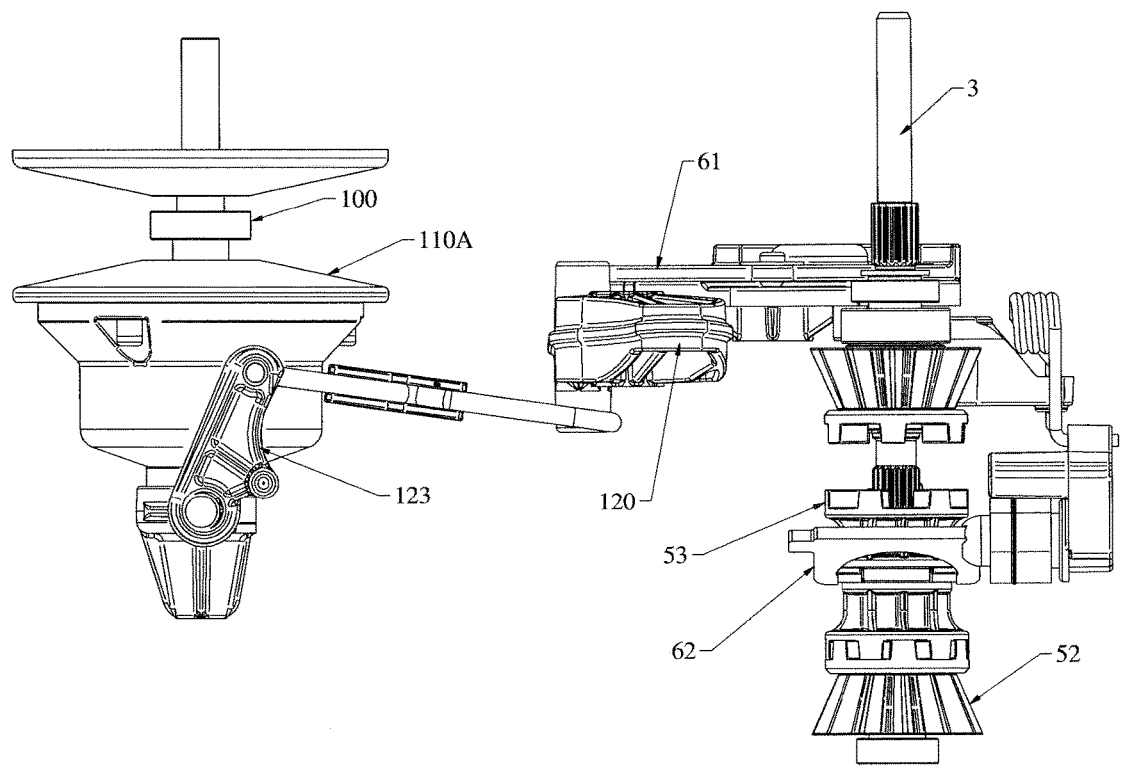
FIGS. 13A and 13B are respectively front and top views of the direction reversing and clutch mechanisms related to the controls of same with the direction reversing control in reverse position and the clutch control in disengaged position.
Figure 13B:
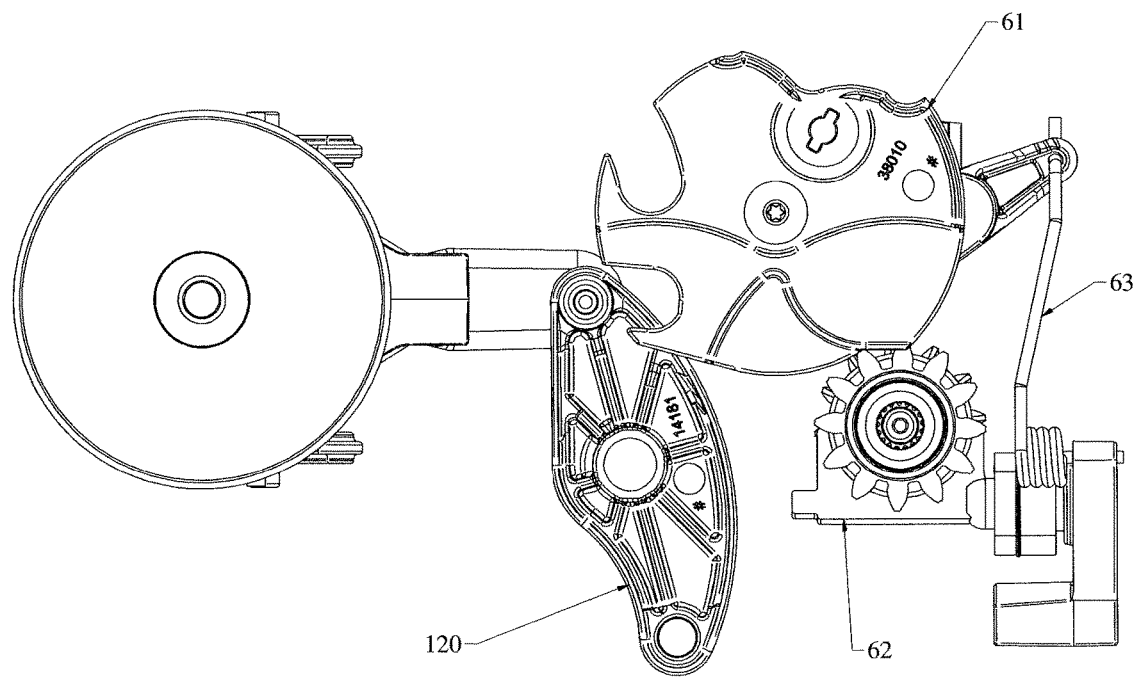

The movement of the forward/reverse dogs is generally transmitted by meshing with the output shaft 4. An example of means for transmitting movement by meshing between the input shaft 3 and the output shaft 4 is shown in FIG. 4. In this embodiment, the movements of the forward and reverse dogs are transmitted via a wheel mounted on a shaft bearing a brake mechanism, described below, to an intermediate shaft by means of pinions, this intermediate shaft transmitting its own movement to the output shaft by means of supplementary pinions engaged with the pinions carried by the output shaft 4.

In the examples shown, the movable dog 53 is in the form of a sleeve constrained to rotate with the input shaft 3 on which it is mounted. This sleeve has an external peripheral annular slot 530. This sleeve is also provided, at each of the extremities of same, with dog teeth forming a castellated ring and the forward and reverse dog elements 51, 52 each form a conical pinion with dog teeth on one of the faces of same.

The transmission assembly also includes a mechanism 7 for braking the input shaft 3 and/or output shaft 4 and/or the means for transmitting movement between the input shaft 3 and the output shaft 4. In the examples shown, the brake mechanism 7 is placed by the transmission means on a shaft engaged by meshing with the forward and reverse dog elements 51, 52. This brake mechanism 7 is controlled by a brake control 8 mounted on said housing 1. This brake mechanism includes at least one pair of cones, the first, indicated using reference sign 71 in the figures and referred to as the external cone, being constrained to rotate with the shaft bearing the brake mechanism 7, and the other, referred to as the internal cone and indicated using reference sign 72, being mounted non-rotatably in relation to said shaft. The internal cone 72 is in the form of a wheel with a conical axial bore and the external cone 71 has an overall truncated cone shape and has a central recess to enable it to be slid onto said body.

In the examples shown, the brake mechanism 7 includes two pairs of parts with conical surfaces, i.e. two pairs of cones each formed by an external cone and an internal cone. The braking and direction reversing means are each fitted with a control carried on the housing. The brake control 8 can be coupled to an operator-actuated brake control member 810, in this case formed by a brake pedal for shifting the brake control from the non-braking position when the pedal is released to a braking position, referred to as the first braking position, when said pedal is depressed. The direction reversing control 6, also carried on the housing, can also be coupled to an operator-actuated direction reversing control member 611, in this case formed by a three-position lever.

This direction reversing control can therefore, when the lever 611 is actuated, shift from the neutral position to the forward position or to the reverse position, and from the forward or reverse position to the neutral position.

Characteristically of the invention, the brake control 8 has a second braking position different from the first braking position. The transmission assembly comprises firstly return means 83 capable, in the neutral position of the direction reversing control 6, of returning said brake control 8 to the second braking position, and secondly means for moving the brake control 8 from the second braking position to the non-braking position, these means for moving the brake control being at least partially formed by the direction reversing control 6 active on said brake control 8, against the return means 83 when said direction reversing control 6 is shifted from the neutral position to the forward position or reverse position.

In the examples shown, the brake control 8 includes a controlled movable part 81 formed by a pivoting lever that can be coupled by movement transmission means to the brake pedal 810 to switch said pivoting lever from the non-braking position to the first braking position. The direction reversing control 6 includes a controlled movable part 61 formed by a rotary or linear cam that can be coupled by movement transmission means to the direction reversing lever 611 to shift the cam 61 from one position to another.

The pivoting lever 81 and the cam 61 are mounted in rotation about parallel axes.

The brake control 8 also includes a two-pronged fork 82 coupled to and constrained to rotate with the controlled movable part 81, each prong of the fork 82 having an internal radial tooth forming the active part of the fork that can be positioned close to at least one of said cones 71, 72 to move said cones 71, 72 closer together.

In the detailed view, the brake mechanism 7 includes a supplementary control 9, referred to as the additional control, that can be actuated by the operator between an inactive position and an active position, this additional control 9 being able, while same is being activated and while the brake control 8 is in the second braking position, to cooperate with the brake control 8 to shift the brake control 8 from the second braking position to the non-braking position.

The brake control 8 is arranged, at least partially, on the path followed by the additional control 9 during activation of same to enable the brake control 8, in parallel with activation of the additional control 9, to be shifted from the second braking position to the non-braking position by simple bearing contact.

As mentioned above, the brake mechanism 7, mounted on the input shaft 3 or the output shaft 4 or a shaft of the transmission means between the input shaft 3 and the output shaft 4, includes at least one pair of substantially coaxial parts with conical surfaces that can be slid onto said shaft, the first or external cone 71 being mounted such that it is constrained to rotate with said shaft, and the second or internal cone 72, being mounted non-rotatably in relation to said shaft, the internal cone 72 being a wheel with a conical axial bore and the external cone 71, which preferably has a truncated cone shape, having a central recess to enable it to be slid onto said body. The brake control 8 is able to cause a relative axial movement of the cones 71, 72 to bring them closer together or further apart. The external cone 71 is, in the closed position of said cones corresponding to the braking position, seated inside the axial bore of the internal cone 72, with the external conical peripheral surface of same engaged by bearing contact with the conical seat of the internal cone 72.

The brake control 8 and the direction reversing control 6 each include at least one controlled movable part 81, 61. Said controlled movable parts 81, 61 are respectively couplable using movement transmission means, in the case of part 81 to the operator-actuated brake control member 810, and in the case of part 61 to the operator-actuated direction reversing control 611.

The controlled movable part 61 of the direction reversing control 6 is a linear or rotary cam 61 and the controlled movable part 81 of the brake control 8 is a pivoting lever 81 stressed by the return means 83 of the brake control 8 into a bearing position against the external profile of the cam 61. Said cam 61 is formed such that, when moving from the neutral position to the forward position or the reverse position, it acts against the return means 83 on the lever 81 in order to move the lever 81.

In the detailed view, the internal cones of the brake mechanism are interposed between the external cones and are moved by the fork 82 arranged between said internal cones. The external cones are held apart and together define a gap of a fixed maximum length inside which the internal cones are seated, the fork forming a separator interposed between said internal cones. The external cones are joined together by means of parallel rods along which the external cones slide towards and away from one another, the extremities of each rod having an axial stop constituting means for holding the cones apart.

The internal cones are moved axially and immobilized in rotation by the shared fork. The wheels forming the internal cones have, on the opposite faces of same, teeth forming a circular slot. The teeth in said castellated ring interpenetrate one another and together form a space for receiving a portion of the shared fork, referred to as the active control portion. Each prong of the fork has an internal radial tooth forming the active control portion of said prong.

The controlled pivoting lever 81 of the brake control 8 is able to occupy a second braking position different from the first braking position and is pushed back to the second braking position by a spring. The first and second braking positions extend on either side of the non-braking position. The pivoting lever 81 is therefore driven in rotation in one direction when the brake pedal is actuated to shift to the first braking position and in the opposite direction by the return means 83 to enable it, in the neutral position of the direction reversing cam, to occupy the second braking position in which said lever 81 bears against the external profile of the direction reversing cam. This profile of the cam 61 is such that the cam 61 causes, by bearing contact on the lever 81 when same is shifted from the neutral position to the forward or reverse position, the lever to shift from the second braking position to the non-braking position. In both the first and second braking positions of the brake control, the fork of said control acts as a separator on the internal cones moving closer to the external cones. In the non-braking position, the fork occupies, between the external cones, a position that enables each internal cone to be held away from the related external cone.

This architecture, as described above, enables the brake control to return automatically, under the action of the return means, to the second braking position when the cam is in the neutral position, without the driver having to take any action. As mentioned above, the brake mechanism 7 includes a supplementary control 9, referred to as the additional control, that can be actuated by the operator between an inactive position and an active position, this additional control 9 being able, while same is being activated and while the brake control 8 is in the second braking position, to cooperate with the brake control 8 to shift the brake control 8 from the second braking position to the non-braking position.

The brake control 8 is arranged, at least partially, on the path followed by the additional control 9 during activation of same to enable the brake control 8, in parallel with activation of the additional control 9, to be shifted from the second braking position to the non-braking position by simple bearing contact.

In the examples shown, the additional control 9 includes a part mounted movably between an inactive position and an active position. This part is formed by a pivoting lever. This movable part can be coupled to an elongated pushrod movement transmission member activated by an operator and positioned on the outside of the machine, preferably behind the machine for shifting said part from one position to another. At least one portion of the brake control 8 is positioned on the path followed by said additional control 9 when same is activated. In this case, the pivoting lever forming the additional control 9 is provided with a pad bearing against the pivoting lever of the brake control 8 when the additional control 9 is shifted from an inactive position to an active position to move the pivoting lever 81 of said brake control 8 into the non-braking position. The additional control 9 is returned to the inactive position by actuating the brake pedal which drives the pivoting lever 81 of said brake control 8 into the first braking position. In this first braking position, the pivoting lever 81 no longer constitutes an obstacle preventing the additional control from returning to the inactive position, which is the case when said lever is in the non-braking position.

The transmission assembly also includes a drive shaft 2 which can be driven in rotation by the primary motor shaft 21. This drive shaft 2 is linked to said input shaft 3 forming the driven shaft by an endless belt drive 11. A clutch mechanism 10 fitted with a clutch control 12 mounted movably between at least an engaged position and a disengaged position is placed between the drive shaft 2 and the output shaft 4. The direction reversing control 6 forms, in the neutral position of said control, means for blocking the clutch control 12 that can prevent the clutch control 12 from shifting from the disengaged position to the engaged position, and the clutch control 12 forms, when the clutch control 12 is in the engaged position, means for locking the direction reversing control 6 that can prevent the direction reversing control 6 from shifting from the forward or reverse position to the neutral position.

This arrangement enables an operating mechanism to be established. In the example shown, the clutch control 12 includes a controlled movable part 120, in this case a pivoting lever 120, carried on the housing 1 and couplable via movement transmission means to an operator-actuated clutch control member 121, in this case formed by a clutch pedal. This controlled pivoting lever 120 is fitted with a male locking member formed by a pad on top of said lever. The controlled cam 61 of the direction reversing control is fitted with two female locking members in the form of notches formed on the external profile of the cam 61. The controlled direction reversing cam 61 forms, in the neutral position, beside the space left free between two notches, a stop limiting the angular movement of the pivoting lever 120 of the clutch control while the locking pad 122 of the pivoting lever 120 of the clutch control becomes seated, in the forward or reverse position of the control direction reversing cam 61, in a notch of said cam when said lever 120 is in the engaged position. It is therefore necessary firstly to move the cam to forward or reverse in order to engage the lever, and secondly to disengage the lever to move the cam from the forward or reverse position to the neutral position.

In the examples shown, the clutch mechanism 10 is built into the belt drive 11.

Specifically, the belt drive 11 is a speed-variation belt drive and includes two pulleys 110, 111 with variable-gap flanges, the first or drive pulley 110 being carried on the drive shaft 2 and the second or driven pulley 111 being carried on the input shaft 3 and means 112 for opening or closing the flanges of the drive pulley 110 in relation to one another. The clutch mechanism 10 includes an idle member 100 that is able to cooperate with the movable flange 110A of the controlled drive pulley 110. This idle member 100, such as a bearing, roller or mounting, has a surface that is free to rotate about the shaft 2 bearing the controlled pulley 110 and about which the belt is partially wound when the flanges of the drive pulley 110 are in open position such as to prevent any transmission of movement between the pulley-bearing shafts 2, 3, the movable flange 110A of the controlled drive pulley 110 overlapping said idle member 100 when the flanges of said pulley 110 are being closed together to enable the belt to be wound around the inside of the slot formed by the flanges and to enable the speed variator to shift from a disengaged position to an engaged position, the continued closing of the flanges of the controlled drive pulley 110 enabling the speed to be varied at will. The means 112 for controlling the opening and closing of the flanges of the drive pulley 110 are at least partially shared with the clutch control 12.

In the examples shown, the pivoting lever of the clutch control acts via relay parts on the movable flange of the drive pulley to drive same towards the other flange of the pulley.

Such a transmission assembly works as follows:

It is assumed that the direction reversing control is in the neutral position. The pivoting brake-control lever 81 is pushed back by the spring 83 against the external profile of the direction reversing control cam 61 into a position corresponding to a braking position, referred to as the second braking position. In this second braking position, the brake mechanism acts as the equivalent of a parking brake.

When the direction reversing cam is controlled following a forward or reverse control of the machine by the driver, the pivoting brake-control lever 81 is pushed back by bearing contact of the cam on the lever 81 to the non-braking position.

If the driver of the machine needs to brake, he simply needs to actuate the brake pedal, which drives the brake control from the non-braking position to the first braking position.

When the driver releases the brake pedal, the brake control returns to the non-braking position or to the second braking position if the direction reversing cam has returned to the neutral position.

The brake mechanism 7 includes a supplementary control 9, referred to as the additional control, that can be actuated by the operator between an inactive position and an active position, this additional control 9 being able, while same is being activated and while the brake control 8 is in the second braking position, to cooperate with the brake control 8 to shift the brake control 8 from the second braking position to the non-braking position.

Indeed, if the driving position of the machine is no longer accessible, it is no longer possible to move the machine by pushing. An additional control is provided to overcome this drawback. The brake control 8 is arranged at least partially on the path followed by the additional control 9 during activation of same to enable the brake control 8, in parallel with activation of the additional control 9, to be shifted from the second braking position to the non-braking position by simple bearing contact.

In the examples shown, the additional control 9 includes a part, in this case a pivoting lever, mounted movably between an inactive position and an active position. This lever can be coupled to an elongated pushrod movement transmission member activated by the operator and positioned on the outside of the machine, usually behind the machine, for shifting said part comprising a pivoting lever from one position to another.

At least one portion of the brake control 8 is positioned on the path followed by the additional control 9 when same is activated. In this case, the pivoting lever of the additional control 9 is provided with a pad that bears against the pivoting lever 81 of the brake control 8 to constrain the pivoting lever 81 of the brake control 8 to shift from the second braking position to the non-braking position by simple bearing contact. The pivoting lever of the additional control 9 is returned to the inactive position by the operator simply actuating the brake pedal.

The transmission assembly works as follows:

It is assumed that the speed-variation and clutch pedal is in the disengaged position, that the direction reversing lever is in the neutral position and that the brake mechanism control is in the second braking position, the brake pedal not being actuated.

The driver cannot actuate the speed-variation and clutch lever on account of the cooperation between the direction-reversing and clutch control. He is therefore bound to actuate the direction reversing lever to shift into forward or reverse. This moves the brake control into the non-braking position and enables the clutch control to be actuated.

The driver then actuates the speed-variation and clutch pedal. This locks the direction reversing control in the forward or reverse position selected.

If he wants to reverse while in forward operating mode, the driver is required to release the speed-variation and clutch pedal, which makes it possible to unlock the direction reversing control, actuate the direction reversing lever to move it to the neutral position, then to engage reverse gear. He can then re-engage the clutch and vary the speed.

If at any point during the forward or reverse movement of the machine he wishes to brake, he need only actuate the brake pedal to move the brake control to the first braking position.

The invention claimed is:

1. A transmission assembly for a self-propelled machine, said transmission assembly being positioned between a primary motor shaft and wheels of said machine, said transmission assembly comprising:
    a transmission housing having an input shaft, which can be driven in rotation by said primary motor shaft in a single direction only, and
    an output shaft, to which the movement of the input shaft can be transmitted by a means for transmitting movement,
    a mechanism for reversing the rotational drive direction of the output shaft,
    a brake mechanism for braking any one of one, two of, or all three of the input shaft, the output shaft, and the means for transmitting movement between the input shaft and the output shaft, wherein said brake mechanism has a brake control,
    wherein said mechanism for reversing the rotation drive direction has a direction reversing control,
    wherein said brake control and said direction reversing control carried by said housing are movably mounted respectively,
    said direction reversing control having at least three positions, including a neutral position, a forward position and a reverse position,
    said brake control having a first braking position and a non-braking position, said brake control being couplable to a brake control member that can be actuated by an operator to shift said brake control from the non-braking position to said first braking position under the action of said brake control member,
    wherein the brake control has a second braking position, separate from the first braking position, and
    wherein the transmission assembly further comprises a first return means,
    said return means being capable, in the neutral position of the direction reversing control, of returning said brake control to the second braking position, and
    wherein the transmission assembly further comprises means for moving the brake control from the second braking position to the non-braking position, said means for moving the brake control being at least partially formed by the direction reversing control, active on said brake control, against the return means when said direction reversing control is shifted from the neutral position to the forward position or reverse position.

2. The transmission assembly as claimed in claim 1, wherein the brake mechanism includes a supplementary control that can be actuated by the operator between an inactive position and an active position, said supplementary control being able, while the same is being activated, and while the brake control is in the second braking position, to cooperate with the brake control to shift the brake control from the second braking position to the non-braking position.

3. The transmission assembly as claimed in claim 2, wherein the brake control is arranged, at least partially, on a path followed by the supplementary control during activation of the same to enable the brake control, in parallel with activation of the supplementary control, to be shifted from the second braking position to the non-braking position by simple bearing contact.

4. The transmission assembly as claimed in claim 1, wherein the brake mechanism, mounted on any one of the input shaft, or the output shaft, or a shaft of a transmission means between the input shaft and the output shaft, includes at least one pair of substantially coaxial parts having conical surfaces that can be slid onto said shaft on which said brake mechanism and coaxial parts are mounted,
    an internal male cone being mounted such that it is constrained to rotate with said shaft on which said coaxial parts are mounted, and a external female cone being mounted non-rotatably in relation to said shaft on which said coaxial parts are mounted,
    the external female cone being a wheel with a conical axial bore and the internal male cone, which has a truncated cone shape, having a central recess to enable it to be slid onto said body, and the brake control is able to cause a relative axial movement of the cones towards or away from one another, the internal male cone, when said external and internal cones are in closed position corresponding to the braking position, being seated inside the conical axial bore of the external female cone, with an external conical peripheral surface of same engaged, by bearing contact, with a conical seat of the external female cone.

5. The transmission assembly as claimed in claim 4, wherein the brake control and the direction reversing control each include at least one controlled movable part, the movable part of the brake control is couplable by movement transmission means to the brake control member and the movable part of the direction reversing control is couplable to a direction revering control means.

6. The transmission assembly as claimed in claim 5, wherein the movable part of the direction reversing control is a linear or rotary cam and in that the controlled movable part of the brake control is a pivoting lever stressed by the return means of the brake control into a bearing position against an external profile of the cam, said cam being formed such that, when moving from the neutral position to the forward or reverse position, said cam acts against the return means on the lever, in order to pivot the lever.

7. The transmission assembly as claimed in claim 6, wherein the pivoting lever and the cam are mounted in rotation about parallel axes.

8. The transmission assembly as claimed in claim 5, wherein the brake control also includes a two-pronged fork coupled to and constrained to rotate with the controlled movable part of the brake control, each prong of the two-pronged fork having an internal radial tooth forming an active part of the two pronged fork that can be positioned close to at least one of said internal or external cones, to move said cones closer together.

9. The transmission assembly as claimed in claim 1, wherein the direction reversing mechanism, carried by any one of the shafts, includes a forward dog element and a reverse dog element, and a movable dog interposed between the forward and reverse dog elements, said forward and reverse dog elements being mounted couplably/uncouplably in rotation on the shaft carrying same by means of the movable dog mounted movably and axially on said shaft using the direction reversing control to occupy a forward dog position in which the movable dog is engaged with the forward dog element, a reverse dog position in which the movable dog is engaged with the reverse dog element or a neutral dog position in which the movable dog is not engaged with either the forward or reverse dog element.

10. The transmission assembly as claimed in claim 5, wherein the transmission assembly also includes a drive shaft that can be driven in rotation by said primary motor shaft, this drive shaft being linked to said input shaft forming the shaft driven by an endless belt drive and, arranged between the drive shaft and the output shaft, a clutch mechanism fitted with a clutch control mounted movably between at least an engaged position and a disengaged position, and the direction reversing control forms, in the neutral position of said control, means for blocking the clutch control that can prevent the clutch control from shifting from the disengaged position to the engaged position, and the clutch control forms, in the engaged position of the clutch control, means for locking the direction reversing control that can prevent the direction reversing control from shifting from the forward or reverse position to the neutral position.

11. The transmission assembly as claimed in claim 10, wherein the clutch control includes at least one movable part that is carried on said housing and couplable, using movement transmission means, to an operator-controlled clutch control member, and the movable part(s) of the clutch control and of the direction reversing control are fitted respectively with a locking member in a first case, and two complementary locking members in a second case, that are able to cooperate alternately with the locking member of the clutch control, depending on whether the direction reversing control is in the forward or reverse position.

12. The transmission assembly as claimed in claim 10, wherein the clutch mechanism is built into the belt drive.

13. The transmission assembly as claimed in claim 12, wherein the belt drive is a variable-speed transmission and includes two pulleys with variable-gap flanges,
   a drive pulley being carried on the drive shaft,
   a driven pulley carried on the input shaft, and
   means for opening or closing variable-gap flanges of the drive pulley in relation to one another, the clutch mechanism includes an idle member that is able to cooperate with said variable-gap flanges of the drive pulley, the idle member being a bearing, roller or mounting, having a surface that is free to rotate about the drive shaft bearing the drive pulley and about which the belt is partially wound when the variable gap flanges of the drive pulley are in an open position, such as to prevent any transmission of motion between the pulley-bearing drive shaft and input shaft,
   the variable-gap flanges of the drive pulley overlapping said idle member when the variable-gap flanges of said drive pulley are being closed together to enable the belt to be wound around an inside of a slot formed by the variable-gap flanges of the drive pulley and to enable a speed variator to shift from a disengaged position to an engaged position, the continued closing of the variable-gap flanges of the drive pulley enabling the speed to be varied at will, and means for controlling the opening and closing of the variable-gap flanges of the drive pulley are at least partially shared with the clutch control.

14. The transmission assembly as claimed in claim 1, wherein the brake control and the direction reversing control each include at least one controlled movable part, the movable part of the brake control is couplable by movement transmission means to the brake control member and the movable part of the direction reversing control is couplable to a direction revering control means.

15. The transmission assembly as claimed in claim 14, wherein the movable part of the direction reversing control is a linear or rotary cam, and in that the movable part of the brake control is a pivoting lever stressed by the return means of the brake control into a bearing position against an external profile of the linear or rotary cam, said linear or rotary cam being formed such that, when moving from the neutral position to the forward or reverse position, said linear or rotary cam acts against the return means on the lever, in order to pivot the lever.

16. The transmission assembly as claimed in claim 1, wherein the transmission assembly also includes a drive shaft that is driven in rotation by the primary motor shaft, the drive shaft being linked to said input shaft forming the shaft driven by an endless belt drive and, arranged between the drive shaft and the output shaft, a clutch mechanism fitted with a clutch control mounted movably between at least an engaged position and a disengaged position, and the direction reversing control, in the neutral position of said control, blocks the clutch control, preventing the clutch control from shifting from the disengaged position to the engaged position, and the clutch control, in the engaged position of the clutch control, locks the direction reversing control preventing the direction reversing control from shifting from the forward or reverse position to the neutral position.

17. The transmission assembly as claimed in claim 16, wherein the clutch mechanism is built into the endless belt drive.

18. The transmission assembly as claimed in claim 17, wherein the endless belt drive is a variable-speed transmission and includes two pulleys with variable-gap flanges,
   the drive pulley being carried on the drive shaft,
   the driven pulley being carried on the input shaft and means for opening or closing variable gap flanges of the drive pulley in relation to one another, the clutch mechanism includes an idle member that is able to cooperate with the variable-gap flange of the drive pulley, the idle member, being any one of a bearing, roller or mounting, having a surface that is free to rotate about the drive shaft bearing the drive pulley and about which the belt is partially wound when the variable-gap flanges of the drive pulley are in open position such as to prevent any transmission of motion between the pulley-bearing drive shaft and input shaft, the variable-gap flange of the drive pulley overlapping said idle member when the variable-gap flanges of said pulley are being closed together to enable the belt to be wound around an inside of a slot formed by the variable-gap flanges and to enable a speed variator to shift from a disengaged position to an engaged position, the continued closing of the variable-gap flanges of the drive pulley enabling the speed to be varied at will, and the means for controlling the opening and closing of the variable-gap flanges of the drive pulley are at least partially shared with the clutch control.

* * * * *